United States Patent [19]

Simmons et al.

[11] Patent Number: 5,209,420
[45] Date of Patent: May 11, 1993

[54] DUAL MODE REEL MOUNTING MECHANISM

[75] Inventors: Louis P. Simmons, Valparaiso; John A. Stuhlmacher, Crown Point, both of Ind.

[73] Assignee: McGill Manufacturing Company, Inc., Valparaiso, Ind.

[21] Appl. No.: 814,324

[22] Filed: Dec. 23, 1991

Related U.S. Application Data

[63] Continuation of Ser. No. 551,944, Jul. 12, 1990, abandoned.

[51] Int. Cl.⁵ .......................................... F16M 13/00
[52] U.S. Cl. ................................... 242/106; 248/278
[58] Field of Search ................ 242/106, 107, 107.7, 242/86, 55.2, 55.53; 248/324, 278, 289.1

[56] References Cited

U.S. PATENT DOCUMENTS

| | | | |
|---|---|---|---|
| 270,208 | 1/1883 | Denton | 242/106 |
| 1,238,571 | 8/1917 | Rosenthal | 242/106 |
| 2,286,904 | 6/1942 | Ewald | 242/86 |
| 2,745,912 | 5/1956 | Meyer | 242/107.7 |
| 2,805,100 | 9/1957 | Shaver | 242/106 |
| 3,039,717 | 6/1962 | Appleton | 242/107.7 |
| 3,065,925 | 11/1962 | Appleton | 242/107.5 |
| 3,490,715 | 1/1970 | Nicpon | 242/107.7 |
| 3,547,371 | 12/1970 | Gruseck | 242/86 |
| 3,604,923 | 9/1971 | Moffatt | 248/324 |
| 4,103,843 | 8/1978 | Nothdurft | 242/106 |
| 4,235,419 | 11/1980 | Schuck | 242/107.2 |
| 4,384,688 | 5/1983 | Smith | 242/107.7 |
| 4,411,395 | 10/1983 | Steffens | 242/106 |
| 4,448,388 | 5/1984 | Dennis et al. | 248/324 |
| 4,529,146 | 7/1985 | Nederman | 242/106 |
| 4,776,527 | 10/1988 | Prowant | 242/106 |
| 4,779,815 | 10/1988 | Moore et al. | 242/106 |
| 5,033,711 | 7/1991 | Gregorich et al. | 248/278 |

FOREIGN PATENT DOCUMENTS

| | | | |
|---|---|---|---|
| 348246 | 2/1957 | Switzerland | 242/106 |
| 465699 | 6/1937 | United Kingdom | 248/278 |

Primary Examiner—Daniel P. Stodola
Assistant Examiner—John Q. Nguyen
Attorney, Agent, or Firm—Leydig, Voit & Mayer

[57] ABSTRACT

A universal mounting mechanism for selectively suspending a power take-up reel from horizontally and vertically disposed supporting surfaces, the mechanism including a fitting having a shank portion and a head portion and a reversible mounting bracket having a cavity with an aperture located therein. The aperture is adapted to receive the fitting and to retain the head portion thereof within the cavity when the bracket is mounted on a horizontally disposed supporting surface. A double clevis having first and second sets of jaws is provided, the first set of jaws being adapted to receive the reel, while the second set of jaws is adapted to capture the shank portion of the fitting when the bracket is mounted on a horizontally disposed supporting surface, the cavity being adapted to receive and retain the second set of jaws when the bracket is mounted on a vertically disposed supporting surface.

10 Claims, 3 Drawing Sheets

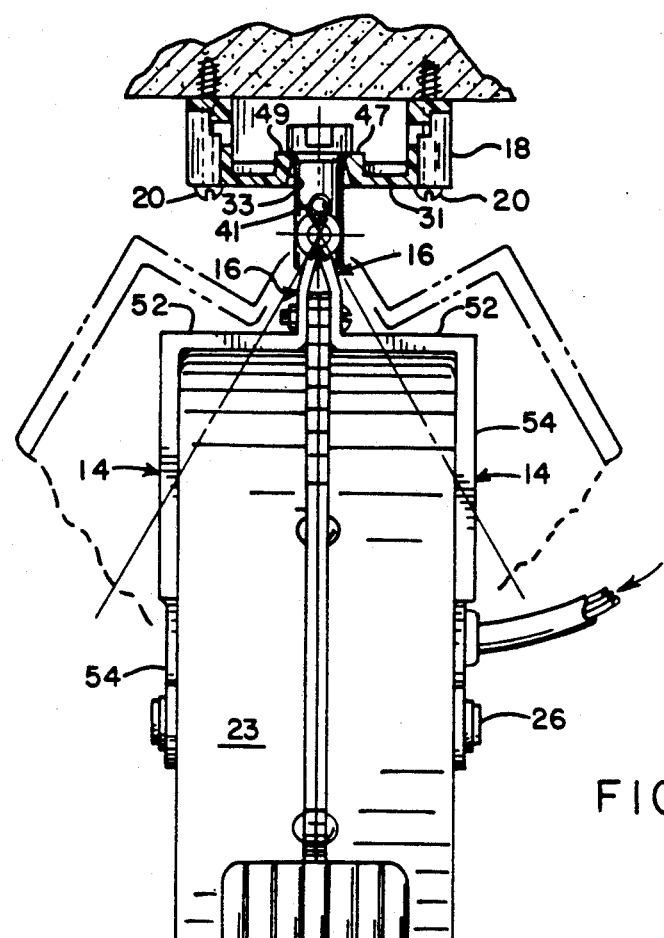
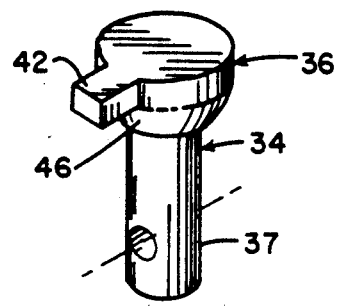
FIG. 4
FIG. 2
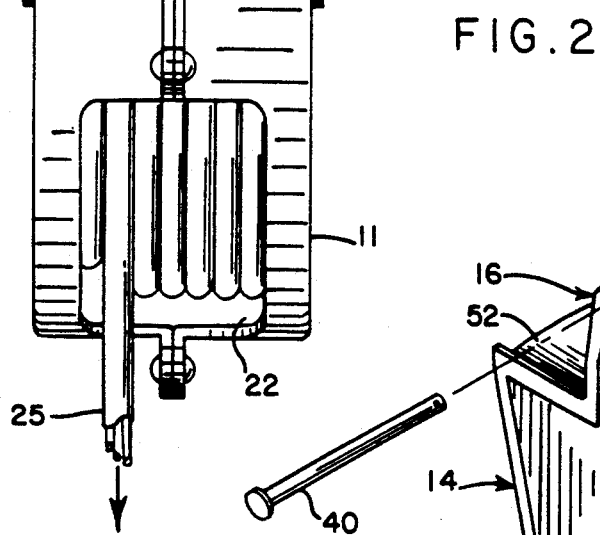
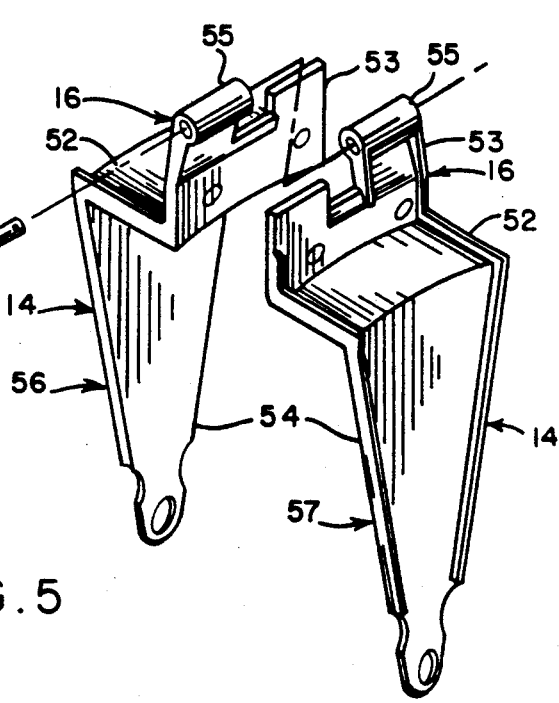
FIG. 5

DUAL MODE REEL MOUNTING MECHANISM

This is a continuation of copending application Ser. No. 07/551,944 filed on Jul. 12, 1990 and now abandoned.

FIELD OF THE INVENTION

The present invention relates generally to mounting mechanisms for electrical cord reels, and more particularly to a clevis and bracket arrangement which permits the mounting of a reel, whether on a wall or ceiling, without affecting the orientation of the reel case.

BACKGROUND OF THE INVENTION

Power take-up reels, which permit an electrical cord to be drawn out and re-wound on a spring-operated spool, are utilized at industrial and construction sites for the purpose of enabling the power cord to be drawn out to the desired location where temporary electrical current is needed. The reel is commonly mounted on a ceiling or a wall adjacent the power source, and the power cord may be drawn from the reel to various locations. The mounting of such reel take-up mechanisms, however, often presents certain problems. Mounting brackets or hangers for supporting the reel on the wall frequently cannot be used for mounting the reel on the ceiling, since the reel is then not supported in a manner which facilitates the easy drawing out and rewinding of the power cord.

Likewise, wall mounting brackets, when used to mount the reel on a ceiling, often do not support the reel in the desired orientation for the easy take-out and return of the power cord. Moreover, when the power cord is drawn out to different locations around the industrial or construction site from a common mounting, the cord can become twisted about the mounting from which the reel is supported, thus affecting the usefulness of the rewinding mechanism and raising safety issues.

OBJECTS AND SUMMARY OF THE INVENTION

One object of the present invention is to provide a power take-up reel with a universal mounting mechanism which permits horizontal or vertical mounting, such as from a ceiling or wall, respectively, without affecting the orientation of the reel case, and without blocking the withdrawal or return of the power cord.

Another object of the invention is to provide a power take-up reel with a universal mounting mechanism, as characterized above, which permits tilting and turning of the reel when in a ceiling mounted orientation and which tends to prevent twisting of the power cord about the reel and mounting mechanism.

Still another object of the invention is to provide a support for a power take-up reel which has a relatively rugged and rust resistant construction to withstand the rigors of usage in industrial environments.

Yet another object of the invention is to provide such a universal mounting mechanism which is relatively simple in construction, utilizing multipurpose and complementally shaped parts, which may be easily fabricated and installed.

Other objects and advantages of the present invention will be more readily apparent upon reading the following description of a preferred, exemplary embodiment, and upon reference to the accompanying drawings.

The present invention is directed to a universal mounting mechanism for suspending a power take-up reel selectively from horizontally and vertically disposed supporting surfaces. The mounting mechanism of the present invention includes a fitting having a shank portion and a head portion and a reversible mounting bracket having a cavity with an aperture located therein. The aperture is adapted to receive the fitting and to retain the head portion thereof within the cavity when the bracket is mounted on a horizontally disposed supporting surface. The mounting mechanism also includes a double clevis having first and second sets of jaws. The first set of jaws is adapted to receive the reel, while the second set of jaws is adapted to capture the shank of said fitting when the bracket is mounted on a horizontal surface, the cavity being adapted to receive and retain the second set of jaws when the bracket is mounted on a vertically disposed supporting surface.

Preferred embodiments are directed to a universal mounting mechanism in which the fitting and the mounting bracket have cooperating means to prevent complete circumferential turning of the fitting in the aperture so that the power cord does not become twisted or tangled about the reel when the reel is suspended from a horizontal surface such as a ceiling or the like. When the reel is suspended from a vertical surface, such as a wall or the like, the double clevis is secured in the cavity by a vertically aligned connecting pin, so that the reel can swing from side to side therearound, thus permitting the cord to be more easily drawn out to the work site where electrical power is needed.

Other preferred embodiments are directed to a universal mounting mechanism in which the head portion of the fitting is provided with a radiused edge so that the fitting can tilt with respect to the mounting bracket, and to a mounting mechanism in which the first set of jaws can be readily opened to facilitate the placement of the reel therebetween without disconnecting the double clevis from the mounting bracket.

While this invention will be disclosed and discussed primarily in terms of specific embodiments thereof, it is not intended to be limited thereto. Other modifications and embodiments will be apparent to those skilled in this art.

BRIEF DESCRIPTION OF THE DRAWINGS

FIG. 2 is a side elevational view of the mounting mechanism and electrical take-up reel of FIG. 1, with the jaws of the mounting mechanism shown by dotted lines in an open position to receive the power take-up reel.

FIG. 4 is an isometric view of the fitting used when the mounting mechanism is secured to a horizontal surface.

FIG. 5 is an exploded view showing the two parts of the double clevis which support the power take-up reel.

DETAILED DESCRIPTION OF THE INVENTION

Figure 1:
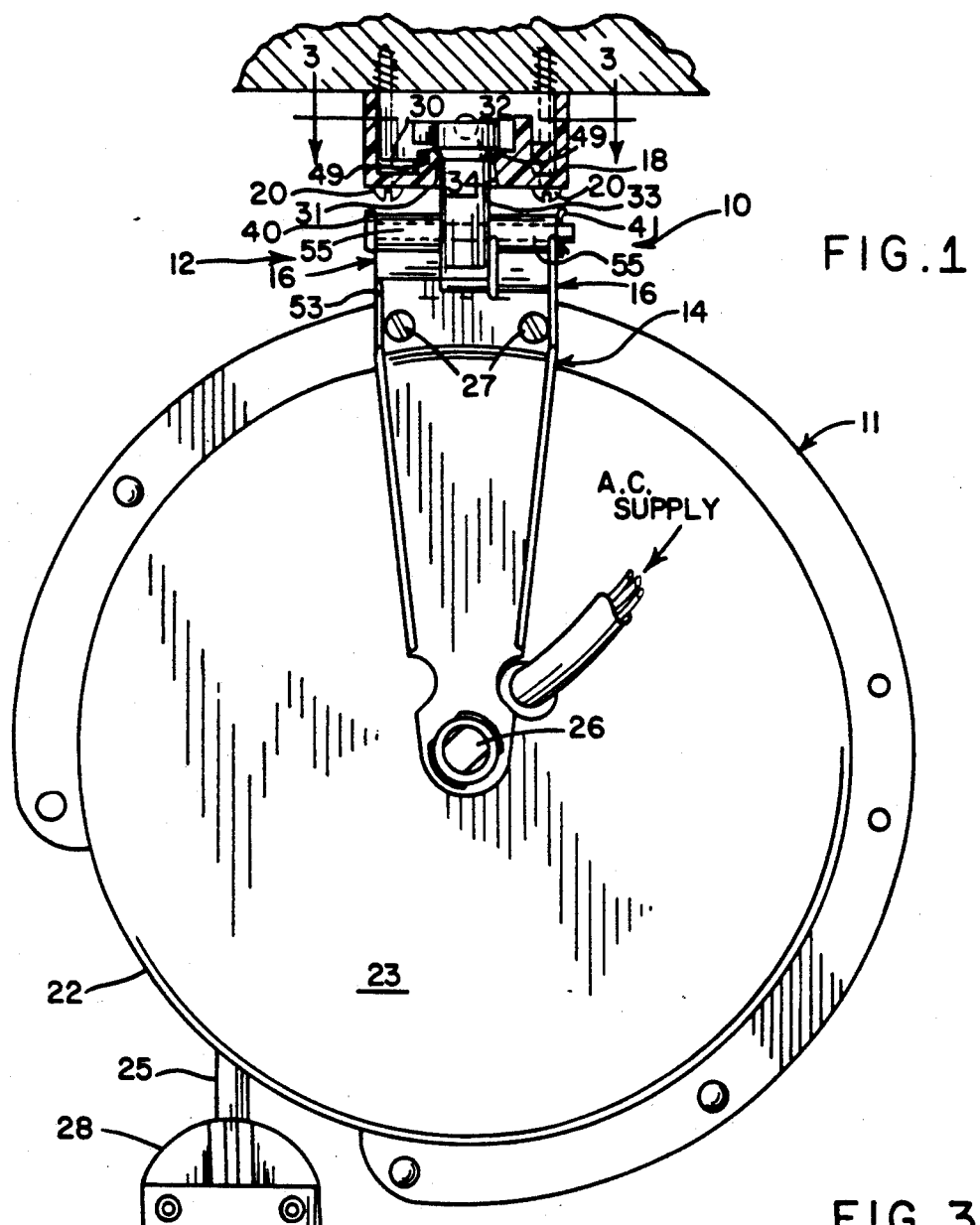
FIG. 1 is an elevational view of the universal mounting mechanism of the present invention, as mounted from a horizontally disposed supporting surface such as a ceiling.

Referring more particularly to the drawings, an illustrative mounting mechanism embodying the present invention is shown in FIG. 1. As disclosed therein, the mechanism, shown generally at 10, is suspending a power take-up reel 11 from a horizontally disposed supporting surface such as a ceiling or the like. The mounting mechanism includes a double clevis shown generally as 12, and a reversible mounting bracket 18, which is attached by suitable connecting means 20, such as screws or bolts, to the horizontal supporting surface.

Figure 6:
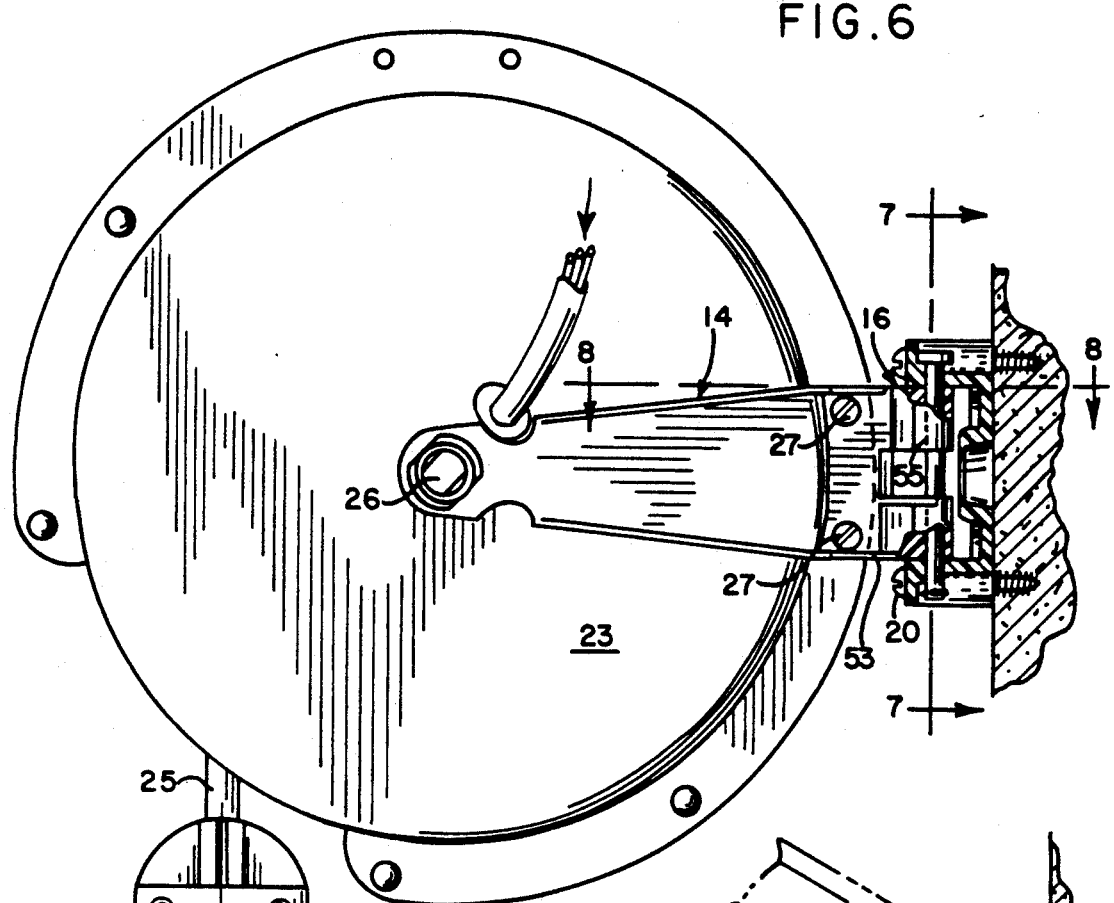
FIG. 6 is an elevational view of the mounting mechanism as mounted to a vertically disposed supporting surface such as a wall.

As shown in FIG. 6, these same elements, the double clevis 12, the mounting bracket 18, and the connecting means 20, are employed when suspending the reel 11 from a vertically disposed supporting surface such as a wall or the like. According to an important aspect of the invention, and as shown by comparing FIGS. 1 and 6, the orientation of the reel is essentially unchanged, whether horizontal or vertical mounting is desired. In either case, the exit opening 22 for the power cord 25 in the reel case 23 is in a downward direction, which allows the cord 25 to be pulled downwardly and out of the reel to various locations.

Those familiar with power take-up reels will appreciate that the take-up reel is provided with a rewind spring (not shown) which is connected to a shaft 26. The shaft and the reel case are usually non-rotatably mounted to the mounting mechanism 10 by connecting means 27, such as those associated with the edge of the reel case and the double clevis of the present invention. The rewind spring is biased to rewind the power cord onto a spool (not shown) when the cord is no longer needed at the work site. Typically, the rewind spring is preset to exert a rewinding force on the spool even when the entire cord is rewound, and a stopping device 28 may be secured to the cord adjacent its free end to engage the reel case 23 and stop the rewinding when the cord is fully rewound.

Figures 7, 8:
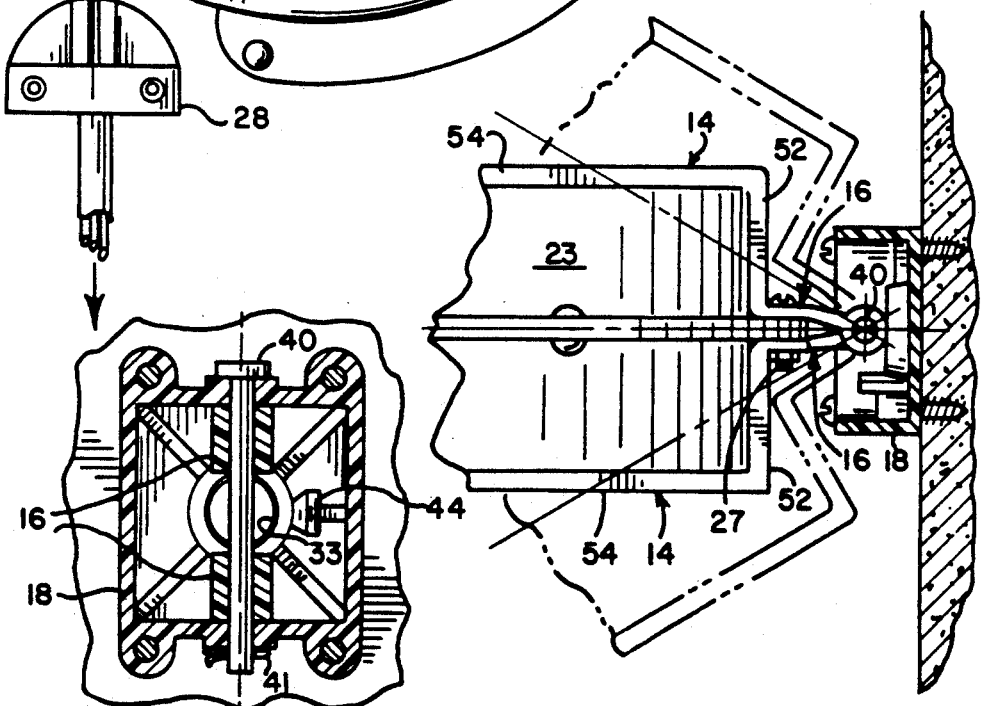
FIG. 7 is a view taken in the plane of line 7—7 of FIG. 6.
FIG. 8 is a view taken in the plane of line 8—8 of FIG. 6.

The double clevis of the present invention has a first set of two jaws (each jaw of the first set of jaws being identified as 14 in the drawings) and a second set of two jaws (each jaw of the second set of jaws being identified as 16 in the drawings), which sets of jaws extend in opposite directions. Each of the jaws 14 of the first set of jaws has a base portion 52, as best shown in FIG. 5, and an arm 54 extending therefrom. As best shown in FIGS. 2 and 8, the arms 54 of the first set of jaws 14 are adapted to be in substantially parallel, spaced relation when the reel is mounted therebetween. Likewise, and again as best shown in FIG. 5, each of the jaws 16 of the second set of jaws has a base portion 53, and an arm 55 extending therefrom. As best shown in FIGS. 1 and 6, the arms 55 of the second set of jaws 16 are adapted to be in substantially parallel, spaced relation. As explained hereinafter, and again with reference to FIG. 5, it is desirable to fashion the first and second sets of jaws by securing together two identical complemental sections 56, 57, each of which includes one arm from each of the first and second sets of jaws.

Figure 3:
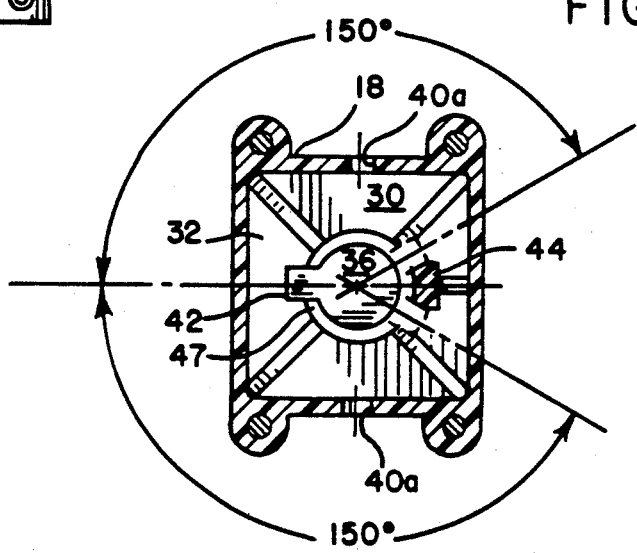
FIG. 3 is a view of the bracket of the mounting mechanism taken in the plane of line 3—3 of FIG. 1.

Turning again to FIG. 1, and with reference to FIG. 3, the mounting bracket 18 has opposing first and second sides 30, 31, with a cavity 32 being located in the first of those sides. The cavity has an aperture 33 located therein, which is adapted to receive a pin-like fitting 34 having head and shank portions 36, 37. The aperture 33 is sized to retain the head portion of the fitting within the cavity 32, while permitting unrestricted rotation or turning of the shank portion thereof. The shank portion of the fitting is captured by a connecting pin 40 and the second set of jaws 16, which (as will be explained hereinafter) are arranged in transverse relation to the first set of jaws 14. The connecting pin 40 is secured in position by a cotter key 41.

In keeping with one of the objects of the present invention, the bracket 18 and the fitting 34 are provided with cooperating means for preventing the complete circumferential turning of the fitting within the aperture 33. This permits the reel to rotate so that the exit opening in the reel case and the cord can be in substantial alignment when the cord is withdrawn therefrom, while preventing the cord from twisting around the mounting bracket 18 or double clevis 12. Such an arrangement contributes to the safety of the work-site by permitting the cord to be neatly rewound on the reel when a length of power cord is no longer needed.

As best shown in FIGS. 3 and 4, the head portion 36 of the fitting is provided with a radially projecting lug 42 which is sized to engage an upstanding stop 44 secured within the cavity 32 of the mounting bracket 18. Rotation of the fitting within the aperture is therefore limited by and the extent of rotation determined by the size of, as determined by the length of the arc encompassed by, the stop. In the preferred embodiment shown in FIGS. 1-3, the stop 44 is sized to permit the lug, and hence the reel, to rotate through an arc of approximately 300°.

In accordance with yet another aspect of the present invention, the head portion, 36 of the fitting 34 is provided with a curved or chamfered lower surface 46 which bears against an annular hub 47 to permit limited tilting of the fitting with respect to the mounting bracket 18. The annular hub 47 circumscribes the aperture 33 and has an outwardly beveled shoulder 49 which cooperates with the lug 42 and provides a clearance space therebetween to facilitate the tilting movement of the fitting 34.

Referring again to FIG. 6, the reel 11 is suspended from a vertically disposed supporting surface by reversing the mounting bracket 18, so that the second side 31 thereof and the supporting surface are in face-to-face relation. The cavity 32 therefore opens outwardly from the supporting surface and is sized to receive therein the second set of jaws 16. In the preferred embodiment shown in the figures, the double clevis 12 is retained in the bracket by inserting the connecting pin 40 through opposed openings 40a in the bracket to engage the ends of the second set of jaws 16. As shown in FIGS. 6, 7 and 8, the axis of opposed openings 40a is disposed perpendicularly to the axis of the aperture 33. The connecting pin is then secured in position with a cotter key 41. When the connecting pin 40 is aligned vertically, as shown in FIGS. 6-8, those skilled in the art will appreciate that the reel and double clevis will swing from side to side therearound, thus permitting the reel case to be substantially aligned with the power cord when the power cord is withdrawn therefrom.

In accordance with a still further aspect of the invention and as explained above, each of the first and second sets of jaws 14, 16 of the double clevis include a base portion 52, 53, respectively, and a pair of substantially parallel arms 54, 55, respectively, extending therefrom. For ease of manufacture, it is desirable to fashion the double clevis by securing together two identical complimental sections 56, 57, each of which includes one arm from each of the first and second sets of jaws, as shown clearly in FIG. 5. The two sections 56, 57 are preferably joined by connecting means 27, such as a nut and bolt, which can be selectively coupled and uncoupled. Since the base portions 52, 53 of the first and second sets of jaws are arranged transversely, the sections 56, 57 can be rotated in opposite directions about the connecting pin 40 when the double clevis is secured in position and connected to the mounting bracket as shown in FIGS. 2 and 8. In this way, the arms of the first set of jaws can be opened to facilitate the placement of the reel case therebetween when the bracket is initially installed, or the replacement of the reel therefrom in the event the reel becomes damaged and requires repair.

While this invention has been disclosed primarily in terms of specific embodiments thereof, it is not intended to be limited thereto. Other modifications and embodiments will become apparent to those skilled in this art. For example, one could replace the lug and stop arrangement with comparable means to prevent complete circumferential turning of the fitting within the aperture. One could also reorient the reel from that shown in FIGS. 1 and 6, or secure the mounting mechanism to an angled, rather than a horizontal or vertical supporting surface, without departing from the spirit or scope of the present invention.

We claim as our invention:

1. A universal mounting mechanism operable in two modes for suspending a reel selectively from either horizontally, in a first mode, or vertically disposed supporting surfaces, in a second mode, said mechanism comprising in combination:
   a reversible mounting bracket having opposing first and second sides, said first side defining a cavity with an aperture located therein and having an axis, said first side being formed with a first surface for mounting in face-to-face relation with a horizontally disposed supporting surface, said axis being substantially perpendicular to said surface and said second side being formed with a second surface for mounting in face-to-face relation with a vertically disposed supporting surface, said bracket having an aligned pair of opposed pin receiving openings communicating with said cavity and having their axis disposed perpendicularly to the axis of said aperture;
   a removable fitting having shank and head portions, said aperture being dimensioned for receiving said shank portion of said fitting and for retaining said head portion thereof within said cavity with said shank portion projecting outwardly therefrom, said shank portion having a through hole extending transversely therethrough and
   a double clevis having first and second sets of jaws and a connecting pin for connecting said second set of jaws, said first set of jaws being dimensioned to receive said reel, and said connecting pin being dimensioned for insertion in said through hole when said first surface of the bracket is mounted on said horizontally disposed supporting surface, said connecting pin being dimensioned for insertion through said opposed openings for retaining said second set of jaws within the cavity of said bracket when said second surface of the bracket is mounted on said vertically disposed supporting surface, wherein when said fitting is removed, said connecting pin is disposed in said opposed openings.

2. The mechanism according to claim 1, wherein each of said first and second sets of jaws includes a base portion and a pair of substantially parallel arms extending therefrom and wherein the arms of each set of jaws extend in opposite directions and the base portions thereof are arranged in substantially transverse relation to the arms.

3. The mechanism according to claim 2, wherein the fitting and the mounting bracket have cooperating means to prevent complete circumferential turning of the fitting in the aperture.

4. The mechanism according to claim 3, wherein the head portion of the fitting has a curved surface to permit limited tilting of the fitting with respect to the mounting bracket.

5. The mechanism according to claim 4, wherein said means for preventing complete circumferential turning comprises a radially projecting lug associated with the head portion of said fitting and an upstanding stop associated with the bracket for engaging said lug.

6. The mechanism according to claim 5, wherein an annular hub having a beveled shoulder circumscribes the aperture in the cavity of the mounting bracket and cooperates with the radiused head portion of the fitting and the radially projecting lug to permit limited tilting of the fitting with respect to the mounting bracket.

7. The mechanism according to claim 2, wherein the connecting pin is vertically aligned when the bracket is mounted on said vertically disposed supporting surface to permit the double clevis to swing therearound.

8. The mechanism according to claim 2, wherein the double clevis includes means for opening the arms of said first set of jaws to facilitate the placement of the reel therebetween.

9. The mechanism according to claim 8, wherein the double clevis comprises two substantially identical complemental sections, each comprising one arm from each of said first and second sets of jaws.

10. The mechanism according to claim 9, wherein the means for opening the arms of said first set of jaws includes means for selectively coupling and uncoupling the complemental sections of said double clevis so that the two sections are rotatable in opposite directions about the connecting pin.

* * * * *